United States Patent [19]
Richardson, III

[11] Patent Number: 5,490,216
[45] Date of Patent: Feb. 6, 1996

[54] SYSTEM FOR SOFTWARE REGISTRATION

[75] Inventor: Frederic B. Richardson, III, Brookvale, Australia

[73] Assignee: Uniloc Private Limited, Singapore

[21] Appl. No.: 124,718

[22] Filed: Sep. 21, 1993

[30] Foreign Application Priority Data

Sep. 21, 1992 [AU] Australia ................................. PL4842
Oct. 26, 1992 [AU] Australia ................................. PL5524

[51] Int. Cl.⁶ ........................................................ H04L 9/00
[52] U.S. Cl. ........................................................ 380/4; 380/23
[58] Field of Search ................................... 380/3, 4, 23, 24, 380/25

[56] References Cited

U.S. PATENT DOCUMENTS

| | | | |
|---|---|---|---|
| 4,654,799 | 3/1987 | Ogaki et al. . | |
| 4,688,169 | 8/1987 | Joshi . | |
| 4,796,220 | 1/1989 | Wolfe . | |
| 4,982,430 | 1/1991 | Frezza et al. . | |
| 4,999,806 | 3/1991 | Chernow et al. | 380/4 |
| 5,191,611 | 3/1993 | Lang | 380/4 |
| 5,199,066 | 3/1993 | Logan | 380/4 |
| 5,222,133 | 6/1993 | Chou et al. | 380/4 |
| 5,239,166 | 8/1993 | Graves . | |
| 5,239,648 | 8/1993 | Nukui | 380/4 |
| 5,287,408 | 2/1994 | Samson | 380/4 |
| 5,291,598 | 3/1994 | Grundy . | |
| 5,313,637 | 5/1994 | Rose | 380/4 |
| 5,319,705 | 7/1994 | Halter et al. | 380/4 |
| 5,337,357 | 8/1994 | Chou et al. | 380/4 |
| 5,343,526 | 8/1994 | Lassers | 380/4 |
| 5,349,643 | 9/1994 | Cox et al. | 380/4 |
| 5,371,792 | 12/1994 | Asai et al. | 380/4 |
| 5,379,433 | 1/1995 | Yamagishi | 380/4 |
| 5,386,468 | 1/1995 | Akiyama et al. | 380/4 |
| 5,388,211 | 2/1995 | Hornbuckle | 380/4 |
| 5,390,297 | 2/1995 | Barber et al. | 380/4 |

FOREIGN PATENT DOCUMENTS

WO9209160  5/1992  WIPO .

*Primary Examiner*—David C. Cain
*Attorney, Agent, or Firm*—Knobbe, Martens, Olson & Bear

[57] ABSTRACT

A registration system allows digital data or software to run in a use mode on a platform if and only if an appropriate licensing procedure has been followed. Preferably, the system detects when part of the platform on which the digital data has been loaded has changed in part or in entirety, as compared with the platform parameters, when the software or digital data to be protected was last booted or run. The system relies on a portion of digital data or code which is integral to the digital data to be protected by the system. This integral portion is termed the code portion and may include an algorithm that generates a registration number unique to an intending licensee of the digital data based on information supplied by the licensee which characterizes the licensee. The algorithm in the code portion is duplicated at a remote location on a platform under the control of the licensor or its agents, and communication between the intending licensee and the licensor or its agent is required so that a matching registration number can be generated at the remote location for subsequent communication to the intending licensee as a permit to licensed operation of the digital data in a use mode. The code portion can be identical for all copies of the digital data. The algorithm provides a registration number which can be "unique" if the details provided by the intending licenses upon which the algorithm relies when executed upon the platform are themselves "unique".

20 Claims, 12 Drawing Sheets

| | |
|---|---|
| NAME: | |
| ORGANIZATION | |
| ADDRESS | |
| CITY | |
| ZIP/POST CODE | |
| COUNTRY | |
| CREDIT CARD/ORDER# | |
| EXPIRE DATE | |
| | |
| LAST USER NO. | ~22 |
| SERIAL NO. | ~50 |
| PRODUCT NO. | |
| YOUR USER NO. | ~21 |
| | |
| REGISTRATION NO. | |

SYSTEM FOR SOFTWARE REGISTRATION

BACKGROUND OF THE INVENTION

1. Field of the Invention

This invention relates to improvements in systems for software registration and, more particularly, to improvements in arrangements where software is transferable by media such as magnetic disks, CD ROMS and the like.

2. Description of the Related Art

Much commercially available software is provided at time of purchase (or license) on a magnetic media, typically a floppy disk. Frequently the only security feature attached to the software is a simple registration number stored on the media. This registration number identifies that particular copy of the software and it is often required at the time of installation of the software onto any given computer that the installer must provide the registration number independently to the installation routines.

However, such simple security arrangements for the distribution of software on media suffer from at lest two disadvantages: (1) each copy of the software made on any given media at the time of manufacture must include an individual, unique number, programmed into the media, and (2) this arrangement does not prevent copying of the software, once installed on any given computer, to another computer by means of file transfer (as opposed to reinstallation).

WO 92/09,160 to Tan Systems Corporation discloses a registration system which is relatively sophisticated which relies for its security on a requirement that an intending software licensee must obtain from a remote location by file transfer significant and essential portions of the program which the licensee desires to execute. The arrangement disclosed in WO 92/09,160 suffers from a number of deficiencies including:

a. the shell program which the intending licensee initially executes requires a unique identity embodied within the shell prior to distribution of the shell program;

b. the shell program is not, itself, a functional program— that is, it does not include all of the code which the intending licensee wishes to execute. That program must be obtained remotely with all the delays, inconveniences and possibilities of corruption during transit that that entails;

c. the prior art system appears to require and indeed, rely on, encryption to ensure that the program material which is communicated from a remote location is not intercepted for utilization in an unauthorized manner; and d. it is unclear whether the system can accommodate and react appropriately to the situation where the program, once registered, is transferred in its entirety from one platform to another so as to avoid the requirement for payment of a further registration fee.

U.S. Pat. No. 4,796,220, assigned to Pride Software Development Corporation, discloses a system for unique recognition of a platform on which licensed software is to be executed. However, U.S. Pat. No. 4,796,220 does not contemplate or disclose utilization of information which is unique to the user or intended licensee as part of the registration process which is to be distinguished from identification of the platform upon which the software is proposed to be run.

U.S. Pat. No. 4,688,169 to Joshi broadly discloses the same principles as U.S. Pat. No. 4,796,220 in that it discloses a computer software security system which relies for its security on a "machine identification code unique to the machine" upon which the software to be protected is to be run. Again, the disclosure is limited to identification of the platform and there is no suggestion or contemplation of linking platform identification with unique user identification.

Also this arrangement does not allow the flexibility of transfer of copies of the program from platform to platform which can be run in a demonstration mode.

It is an object of the present invention to address or reduce the above-mentioned disadvantages.

Definitions

Throughout this specification the term "software" is to be interpreted broadly so as to include all forms of digital data which are executable on a platform (as to be later defined). The digital data comprising the software can, for example, be code comprising a word processing program adapted to run on a PC or the like. The software can also, for example, be digital data stored on a CD ROM adapted for playback as music on a CD ROM audio drive. The digital data can be displayable information or information which is otherwise usable by a licensed user.

Throughout this specification the term "platform" denotes an environment to be associated with a computing device such as a microprocessor or other data processing device which permits execution of the digital data (to which reference has previously been made in relation to the term "software") whereby the computer can perform functions on input and output devices associated therewith.

In some circumstances, the "software" or digital data may itself be the operating system environment. Typically, but by no means exclusively, examples of operating system environments include the MicroSoft DOS operating system, the IBM OS/2 operating system or the Macintosh System 7 environment. In the degenerate case of microcontrollers operating from ROM, the operating system environment may be the microcode of the microcontroller which enables the microcontroller to execute machine code.

In this specification, "use mode" refers to use of the digital data or software by its execution on a platform so as to fulfill the seller's/licensor's obligations in relation to the sale or license of the right to execute the digital data or software in the use mode. The use mode is to be distinguished from what might generally be termed unlicensed modes of operation (which is not to say unauthorized modes of operation) as typified by the demonstration modes later described in this specification.

SUMMARY OF THE INVENTION

In broad terms, the system according to the invention is designed and adapted to allow digital data or software to run in a use mode on a platform if and only if an appropriate licensing procedure has been followed. In particular forms, the system includes means for detecting when parts of the platform on which the digital data has been loaded has changed in part or in entirety as compared with the platform parameters when the software or digital data to be protected was for example last booted or run or validly registered.

The system relies on digital data or code which forms part of the digital data to be protected by the system. This portion of the digital data which preferably is integral to the digital data to be protected has been termed the "code portion" elsewhere in this specification. The code portion includes an algorithm adapted to generate a registration number which is unique to an intending licensee of the digital data based on information supplied by the licensee which characterizes the licensee.

The algorithm in the code portion is duplicated at a remote location on a platform under the control of the licensor or its agents and communication between the intending licensee and the licensor or its agent is required so that a matching registration number can be generated at the remote location for subsequent communication to the intending licensee as a permit to licensed operation of the digital data in a use mode.

Preferably, the code portion is integral with the digital data and can be identical for all copies of the digital data. It is the algorithm embedded within the code portion (and which is duplicated at the remote location) which provides a registration number which can be "unique" if the information provided by the intending licensee upon which the algorithm relies when executed upon the platform is itself "unique."

In any event, in particular preferred forms, a serial number (see further on) is included in the registration number generation algorithm which introduces an additional level of uniqueness into the registration number calculation process.

Accordingly, in one broad form of the invention there is provided a system for licensing use of digital data in a use mode, the digital data executable on a platform, the system including local licensee unique ID generating means and remote licensee unique ID generating means, the system further including mode switching means operable on the platform which permits use of the digital data in the use mode on the platform only if a licensee unique ID generated by the local licensee unique ID generating means has matched a licensee unique ID generated by the remote licensee unique ID generating means.

Preferably, the system further includes platform unique ID generating means, wherein the mode switching means will permit the digital data to run in the use mode in subsequent execution of the digital data on the platform only if the platform unique ID has not changed.

Preferably, the mode switching means permits operation of the digital data in the use mode in subsequent execution of the digital data only if the licensee unique ID generated by the local licensee unique ID generating means has not changed.

Preferably, the mode switching means includes part of the digital data.

Preferably, the remote licensee unique ID generating means comprises software which includes the algorithm utilized by the local licensee unique ID generating means to produce the licensee unique ID.

Preferably, the information utilized by the local licensee unique ID generating means to produce the licensee unique ID comprises prospective licensee credit card number, date of birth and full name and address.

Preferably, the platform unique ID generating means forms part of the digital data.

Preferably, the platform unique ID generating means utilizes hard disk information and/or other computer hardware or firmware information to determine the platform unique ID.

Preferably, the platform comprises a computer operating system environment.

Preferably, the digital data comprises a software program adapted to run under the operating system environment.

In a further broad form of the invention, there is provided a security routine or registration means attachable to software to be protected, the registration means generating a security key from information input to the software which uniquely identifies an intended registered user of the software on a computer on which the software is to be installed.

Preferably, the security key is generated by a registration number algorithm.

Preferably, the registration number algorithm combines information entered by a prospective registered user unique to that user with a serial number generated from information provided by the environment in which the software to be protected is to run (e.g., system clock, last modify date, user name).

Preferably, the registration means is replicated at a registration authority and used for the purposes of checking by the registration authority that the information unique to the user is correctly entered at the time that the security key is generated by the registration means.

Preferably, the registration means checks at the time of boot of the software as to whether it is a first boot of the software to be protected or a subsequent boot. If a subsequent boot is detected, then environment and user details are compared to determine whether the program reverts to a demonstration mode and a new user registration procedure is to commence, or a full version run.

Preferably, the environment details comprise one or more of disc volume name, user name or computer, initialization date of hard disk, hardware identifier (e.g., ROM checksum) or other elements which are generally not user-configurable on the platform.

In a further broad form of the invention, there is provided a method of control of distribution of software, the method comprising providing mode-switching means associated with the software adapted to switch the software between a fully enabled mode and a partly enabled or demonstration mode; the method further comprising providing registration key generating means adapted to generate an enabling key which is a function of information unique to an intending user of the software; the mode-switching means switching the software into fully enabled mode only if an enabling key provided to the mode-switching means by the intending user at the time of registration of the software has matched identically with the registration key generated by the registration key generating means.

Preferably, the enabling key is communicated to the intending user at the time of registration of the software by a third party operating a duplicate copy of the registration key generating means.

In yet a further broad form of the invention, there is provided digital data incorporating registration code, the digital data executable on a platform; the registration code comprising a portion of the digital data executable on the platform so as to switch the digital data between a demonstration mode and a use mode.

Preferably, the registration code when executed on the platform provides local licensee unique ID generating means whereby the digital data can be switched from the demonstration mode to the use mode by execution of the registration code only if a licensee unique ID generated by the local licensee unique ID generating means has matched a licensee unique ID generated by remote licensee unique ID generating means.

BRIEF DESCRIPTION OF THE DRAWINGS

Embodiments of the invention will now be described with reference to the accompanying drawings wherein:

FIG. 4 is a personal information dialogue box relating to the procedure of FIGS. 2a, 2b, 2c in accordance with a third embodiment;

DETAILED DESCRIPTION OF THE PREFERRED EMBODIMENT

It is to be understood that, in its various embodiments, the present invention is for the protection of digital code/software by control of permission to use the digital code/software. A hardware platform and a remote registration station implemented at least partially by means of electronic hardware are required by the various embodiments.

The code/software to be protected requires at least some adaption to be usable with the invention in its various embodiments. The adaptation can be universal for all copies of the code/software to be protected.

First Embodiment

Figure 1:
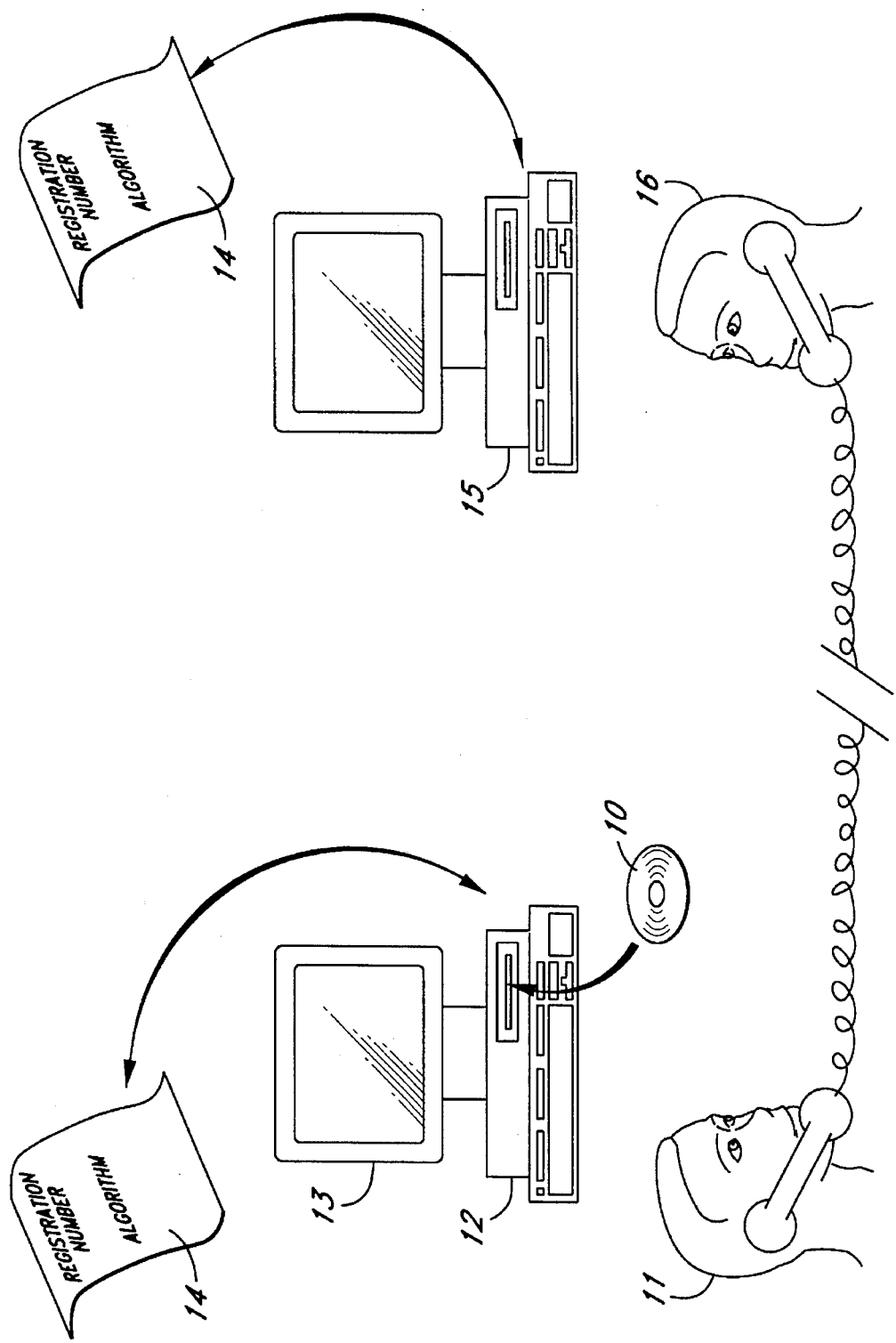
FIG. 1 is a schematic diagram of the relationship and interaction between an intending registered user and a registration authority of software on media secured according to a first embodiment of the invention.
Figure 8:
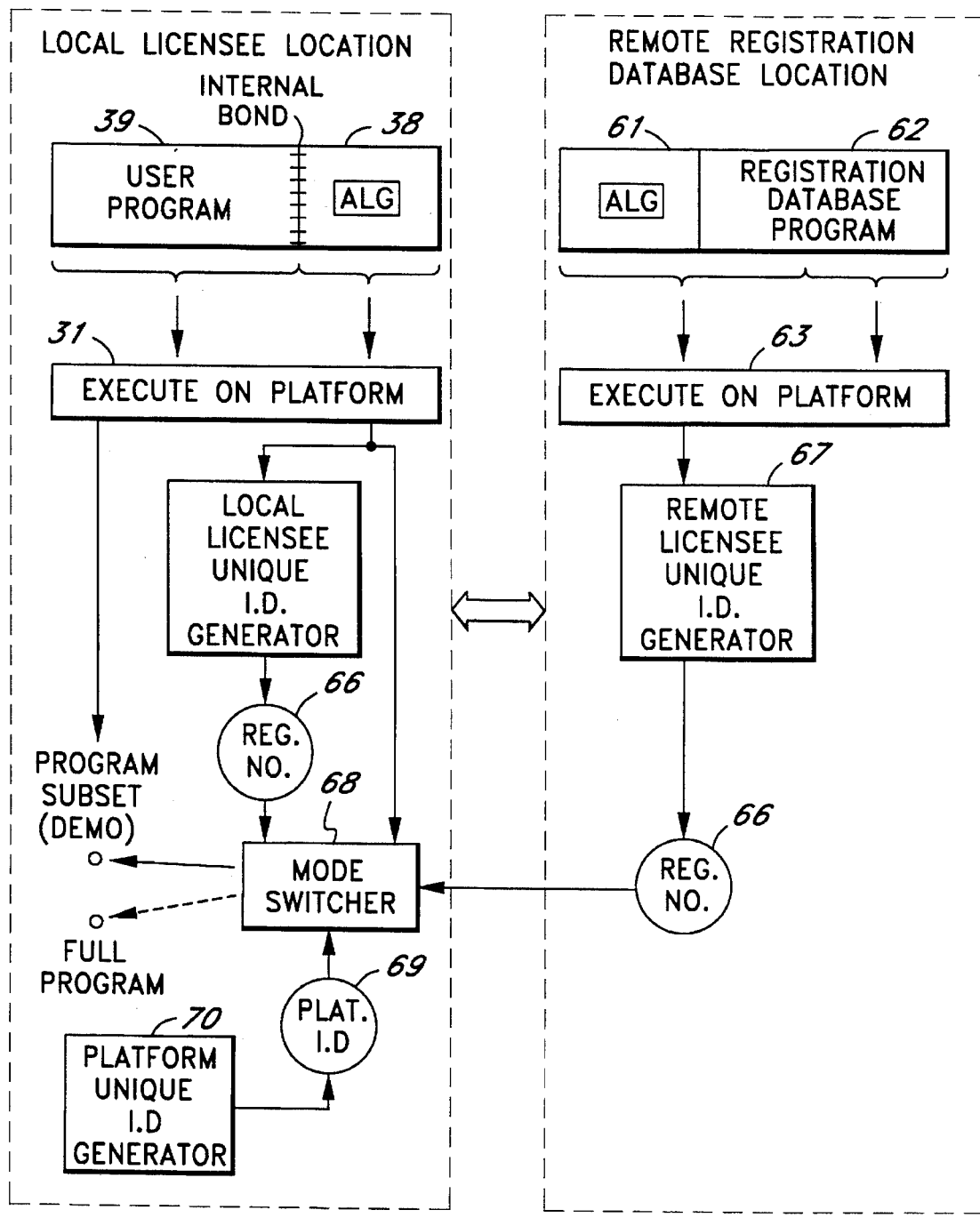
FIG. 8 is a block diagram of a generalized system according to a fifth embodiment of the invention.

With reference to FIGS. 1 and 8, the system according to embodiments of the invention is designed and adapted to allow digital data 39 or software to run in a use mode on a platform 31 if and only if an appropriate licensing procedure has been followed. In particular forms, the system includes means for detecting when parts of the platform 31 on which the digital data 39 has been loaded has changed in part or in entirety as compared with the platform parameters when the software or digital data to be protected was, for example, last booted or run or validly registered.

The system relies on digital data or code 38 which forms part of the digital data to be protected by the system. This portion of the digital data, which preferably is integral to the digital data to be protected, has been termed the code portion 38 elsewhere in this specification. The code portion 38 includes an algorithm adapted to generate a registration number 66 or local licensee unique ID or registration key which characterizes the licensee. In this instance, the local licensee unique ID generator which generates the registration number comprises the execution of code 38 on platform 31.

The algorithm in the code portion is duplicated at a remote location on a platform 67 under the control of the licensor or its agents, and communication between the intending licensee and the licensor or its agent is required so that a matching registration number or enabling key can be generated at the remote location for subsequent communication to the intending licensee as a permit to licensed operation of the digital data 39 in a use mode.

Execution of the duplicated code portion on platform 67 comprises, in this instance, the remote licensee unique ID generating means.

Mode switching means can comprise execution of the code portion which additionally performs a comparison of the locally and remotely generated registration numbers.

Preferably, the code portion 38 is integral with the digital data and can be identical for all copies of the digital data. It is the algorithm embedded within the code portion (and which is duplicated at the remote location) which provides a registration number which can be "unique" if the information provided by the intending licensee upon which the algorithm relies when executed upon the platform is itself "unique".

In any event, in particular preferred forms, a serial number (see further on) is included in the registration number generation algorithm which introduces an additional level of uniqueness into the registration number calculation process.

With particular reference to FIG. 1, a program comprising digital data protected according to a first embodiment of the invention is supplied recorded on a magnetic disk 10.

Included as part of the software on that disk 10 is a registration and re-registration routine which executes whenever the program protected by the arrangement of the first embodiment "boots".

With reference to FIG. 1 and FIGS. 2a, 2b and 2c, the operation of the security routine will be described on the assumption that the program on the disk 10 protected by the registration routine has not been registered on the platform or is otherwise being loaded for the first time.

The prospective new user 11 inserts disk 10 into the user PC 12 so as to be read by PC 12.

As part of the software installation procedure, the registration routine is activated causing a series of dialogue boxes to appear on the display 13 of the user PC 12. Having checked to ensure that the software has not previously been registered on the PC 12, a dialogue box A (in FIG. 2a) is displayed which provides the user with a choice of either seeing a demonstration of the software (which typically has features such as save and/or print disabled) or alternatively an invitation to register ownership/licensee of the software (after which all features of the software are made available to the user).

If the register option is selected or if the user cancels the demonstration in favor of registration, then a contact dialogue box B (in FIG. 2a) is presented on the display 13 which provides a list (stored on disk 10 as part of the registration routine) which provides for example, names and contact numbers of the software publishing company together with other general product information.

Following the user's indication of agreement during display of license details (box B1) to proceed to register, the user can contact the registration center after filling out the registration dialogue box C as detailed below. After selecting "continue", the registration routine begins the first step in the generation of a security key which will be unique to the current copy of the software and to certain features of the environment in which it runs.

Figure 2A:
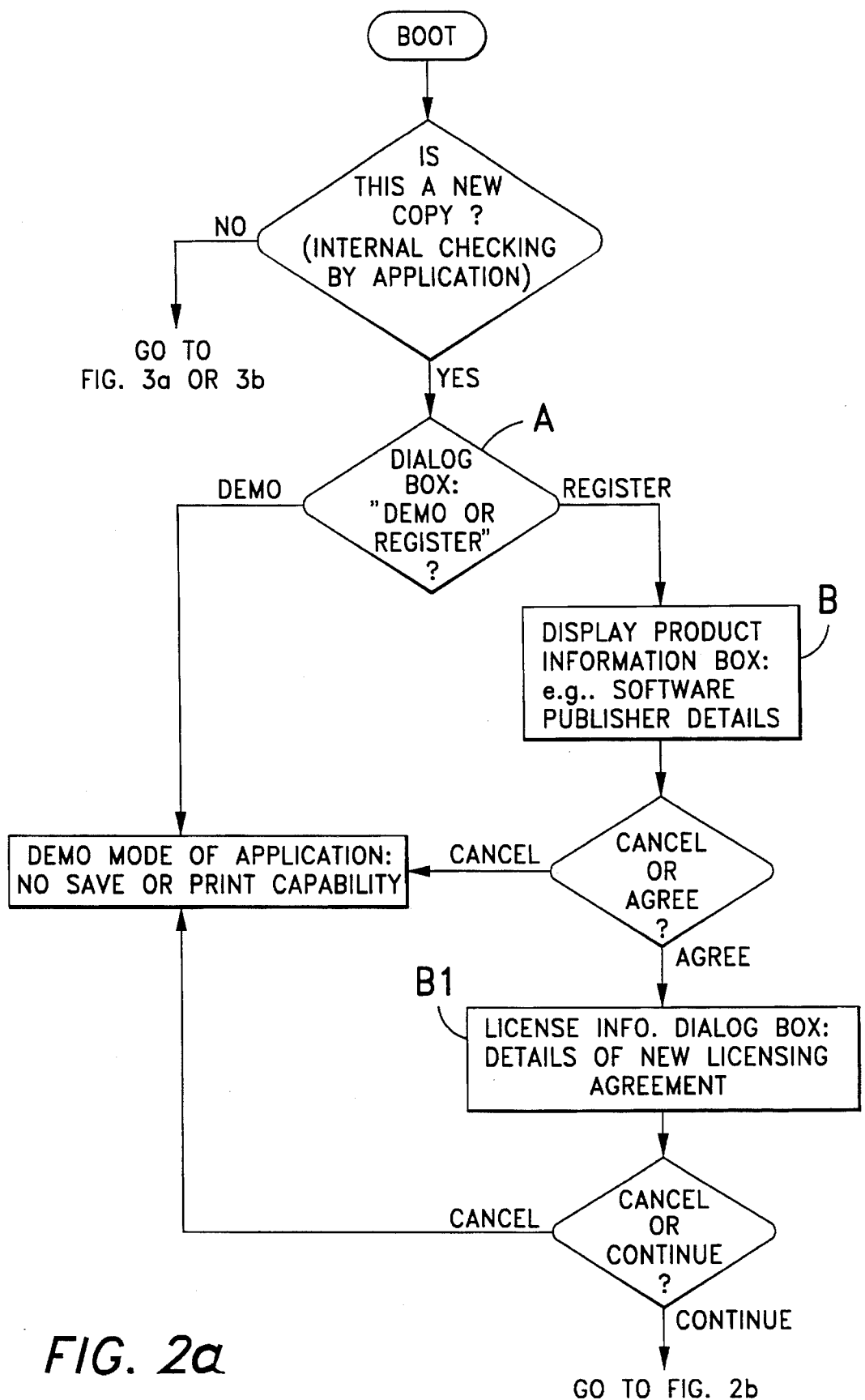
FIGS. 2a, 2b and 2c are segments of a flow chart of the procedure to be followed during registration of software by a user according to a first embodiment of the invention.
Figure 2B:
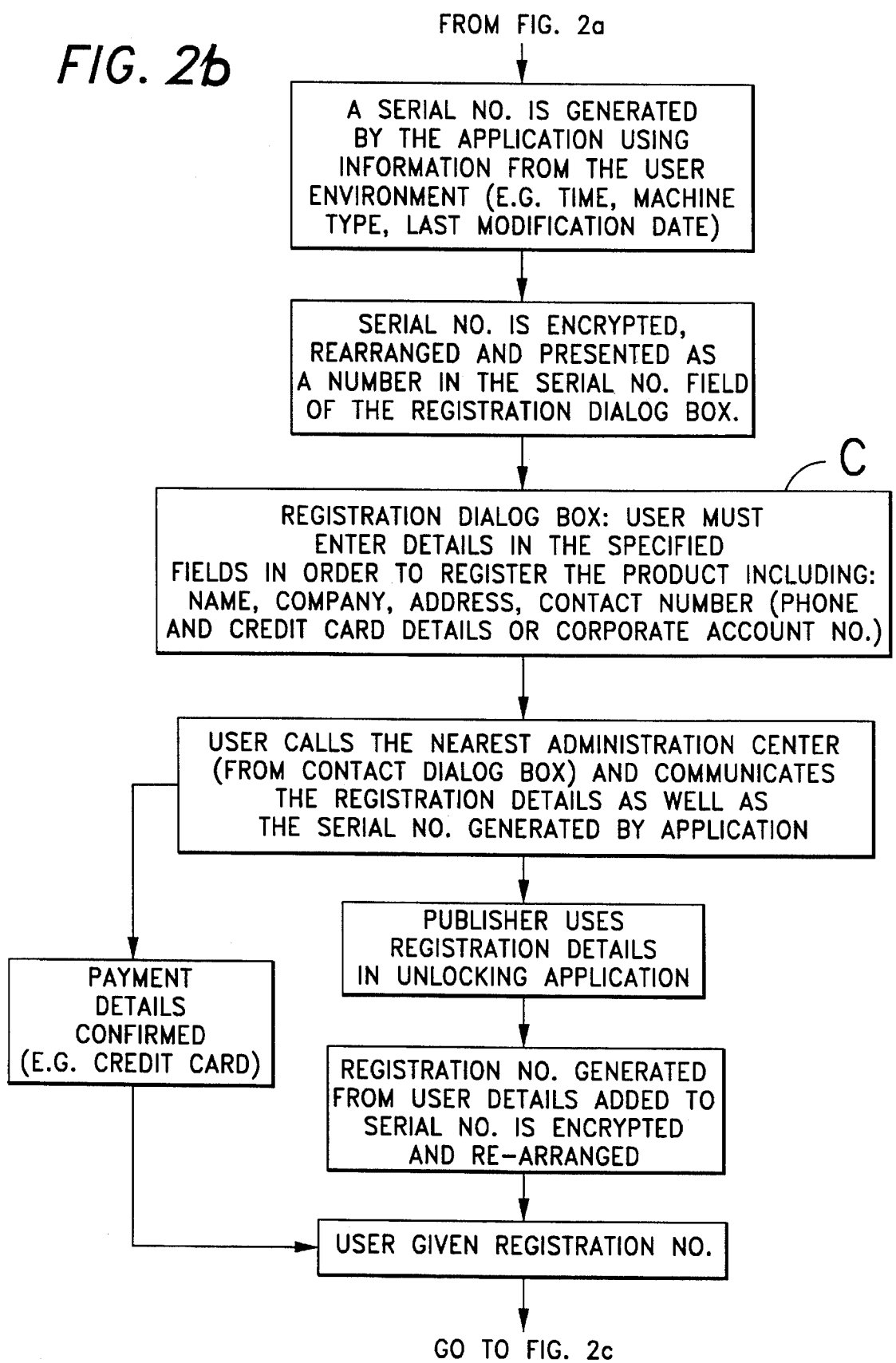
Figure 2C:
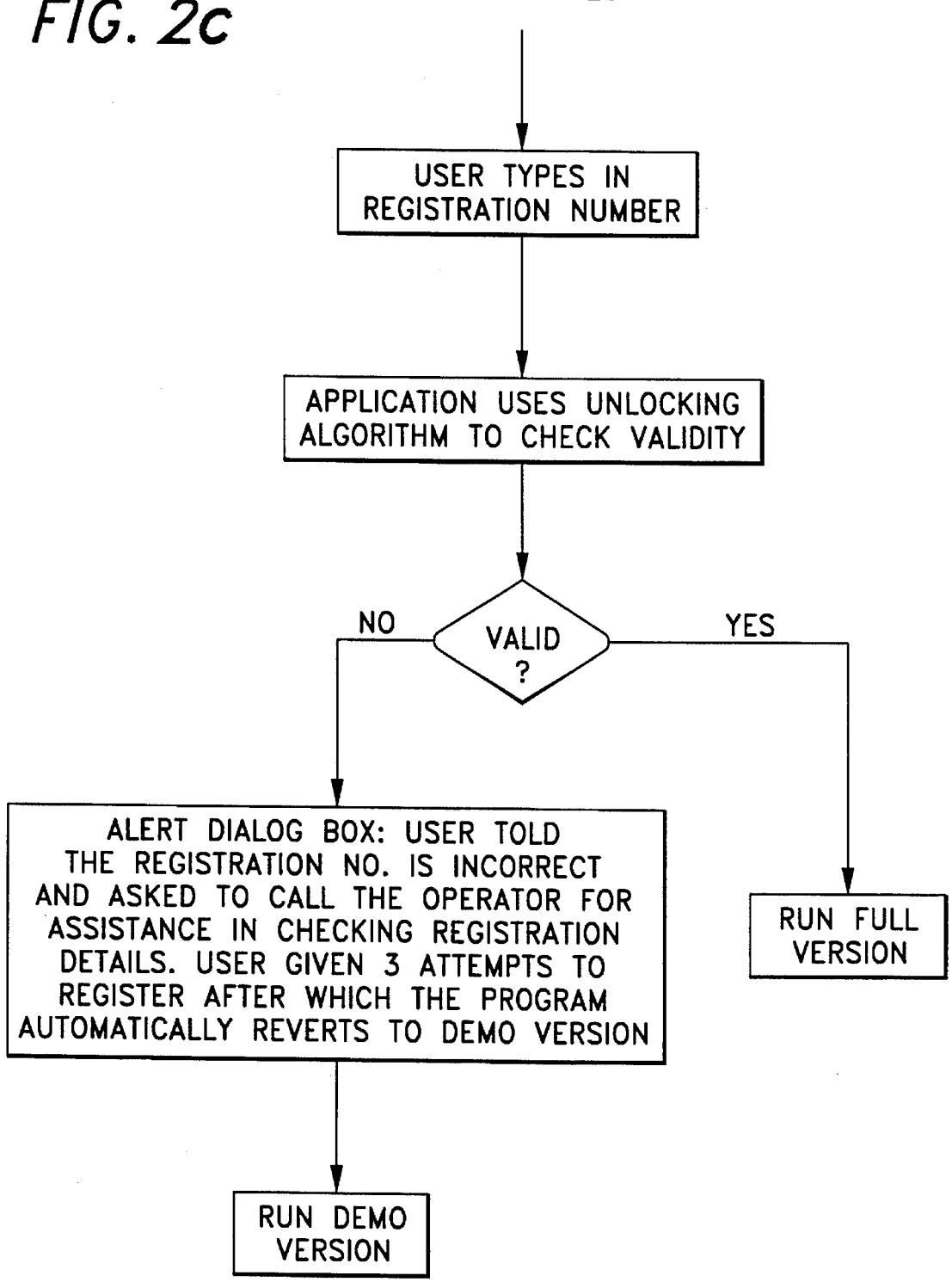

As shown in FIG. 2b, the first step in the generation of the security key comprises the generation of a serial number generated from the current time on the system and, in this example, the last modify date of the software and other information from the computer environment. The serial number is encrypted and rearranged and then presented as a number in the registration dialogue box on the display 13.

The registration dialogue box C (in FIG. 2b) prompts the user for details unique to that user (including, for example, name, company, address, state, contact number) together with financial details for payment for the purpose of becoming a registered user of the software protected by the registration routine (for example Mastercard or corporate account number details). This information, unique to the user, is passed through a registration number algorithm 14 (represented symbolically in FIG. 1) which generates a registration number or security key from the information unique to the user together with the serial number previously generated. The registration number or security key is not made available to the user of the PC 12 by the PC 12.

An identical registration number algorithm 14 resides on the registration authority PC 15. As an integral part of the registration procedure, the prospective new user 11 communicates the information unique to the user which was entered by the user on the user PC 12, along with the serial number generated by the user's algorithm, to the registration authority 16. The registration authority feeds this information into the registration authority PC 15 wherein the registration number algorithm 14 should produce an identical registration number or security key to that produced by the user PC 12 if the details communicated to the registration authority by the prospective new user 11 match with the details that have been entered on the user PC 12. Optionally, the user can communicate the information to the registration authority electronically, e.g., by fax or modem or tone phone.

As a final stage in registration (refer to FIG. 2d), the registration authority 16 provides the registration number generated by the registration authority PC 15 to the user 11. The user 11 enters the registration number into the user PC 12 where the registration routine checks to see whether the entered registration number matches the calculated registration number. If the two match, then a valid registration has taken place and access is provided by the registration routine to a full operating version of the software protected by the registration routine. If there is no match and a preference file (which stores the user details) does not exist then a dialogue box D (FIG. 2c) appears on the display 13 of user PC 12 providing the prospective new user 11 with the opportunity to check his/her details or switch to the demonstration version of the software protected by the registration routine.

Again, the registration authority PC 15 can provide to PC 12 the registration number which it generates by electronic means such as modem communication.

It will be evident that it is not obvious to the prospective new user 11 that the registration number which unlocks the full version of the software protected by the registration routine is, in fact, generated from an algorithm residing on the magnetic disk 10 and that it forms part of the software to which access is desired.

In this manner, the registration procedure outlined above ensures that exactly the same details entered by the prospective new user on his/her user PC 12 are those details recorded by the registration authority 16. It will also be evident that the procedure does not require each magnetic disk 10 containing a copy of the software to be protected to have a unique registration number recorded on the disk at the time of distribution of the disk. Each copy has exactly the same registration number algorithm located upon it. A unique registration number or "security key" is generated only at the time of registration from the details supplied by the prospective new user 11.

The registration routine behaves generally as follows where any copy of the protected software boots. In this situation, the registration routine checks at the time of boot to see what registration details are present for that particular copy of the software. If no details are present, then it is assumed that the PC is booting from a newly distributed magnetic disk and registration is to occur for the first time. The registration procedure in that case is that followed in respect of FIGS. 2a, 2b and 2c.

In the event that registration details are present, then the registration routine checks a number of parameters which are expected to be unique to the environment in which the software to be protected operates. In this embodiment, the parameters checked are hard disk volume name, user name, and computer name and user password and hard disc initialization date (not generally user configurable on the Apple Macintosh computer). The registration routine then checks these parameters against the corresponding details that it finds from the operating environment of the computer on which the software is running. If a designated combination of these details matches then it is assumed that a properly authorized and registered copy of the software is running and full access to the software is allowed.

In this manner, it is quite in order for users to provide other users with copies of the software protected by the security routine. The security routine attached to the software to be protected determines from the environment in which it operates whether an additional registration fee is required. If it is determined by the registration routine that this is the case, then the registration routine has the capability to provide a fresh registration number as part of an authorized registration procedure pending which the protected software reverts to demonstration mode.

Second Embodiment (Auto re-registration)

Figure 3:
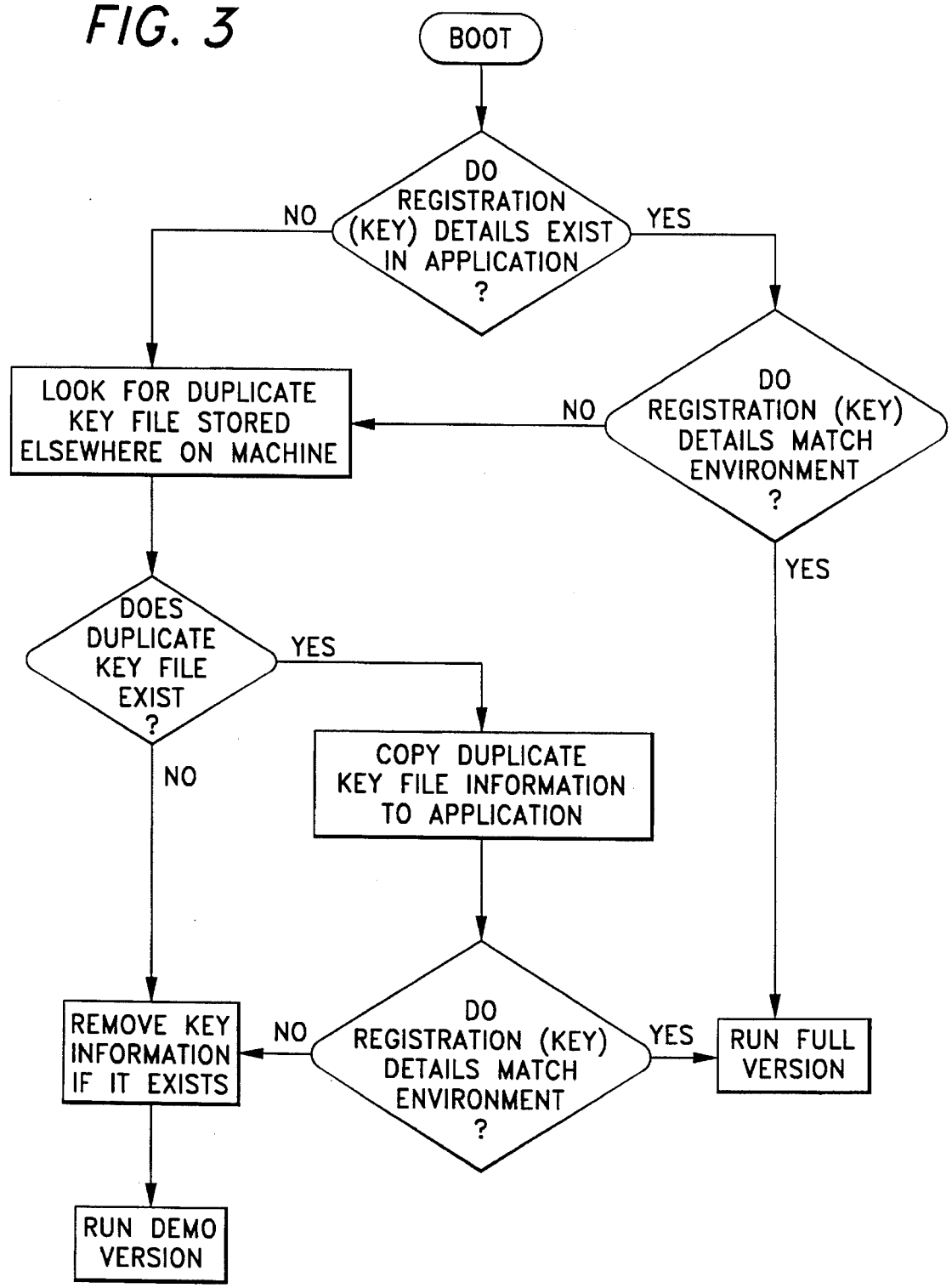
FIG. 3 is a flow chart of alternative boot processes according to a second embodiment of the invention.

According to a second embodiment, a more sophisticated procedure suitable for checking at first boot and at subsequent boot is shown in flowchart form in FIG. 3.

This procedure incorporates redundancy to cope with situations where the key file containing the information from which the current use has been authorized may have been deleted or does not exist on a subsequent boot.

The distinction as against the first embodiment is that a "key file" is created at the time of registration of the software and a duplicate key file is also created at the same time. The duplicate key file is arranged to be stored on the computer at a location separate from the program to be protected. In the case of the Apple Macintosh computer the duplicate key file can be stored in the "system" folder.

Both the key file (stored with the software) and the duplicate key file are encrypted and both contain identical information. The information contained comprises:

1. The user registration details including the serial number,

2. The environment details of the computer, and

3. Details of the application protected by the security routine for which registration is to be or has been obtained.

With reference to FIG. 3, whenever the protected application boots, a check is made by the registration routine to determine whether registration details exist in the key file of the protected application. If they do, a comparison is made by the registration routine between what is stored in the key file and the environment to determine whether a change has taken place to the environment as compared with what is stored in the key file. If no change is detected, then the protected application is permitted to run normally.

If there are no registration details present in the key file or if the above-referenced comparison between the key file contents and the application does not show a match, then the re-registration routine of FIG. 3 looks for the existence of a duplicate key file within the environment. If a duplicate key file exists, then the information contained within that duplicate key file is copied to the application key file and comparisons as previously described as between the key file details and the environment and application are made. If the comparison is positive, then the protected application is allowed to run normally. If the comparison proves negative, then the protected application is permitted to run by the registration routine in demonstration mode only. If a duplicate key file is found not to exist at all and the internal key file, if present, brings a negative result, then the protected application is allowed to run in demonstration mode only.

This arrangement provides improved durability for the registration routine in the sense that it is less likely that the protected application will be caused to run in demonstration mode for incorrect reasons.

Third Embodiment

Tracking System

With reference to FIG. 4, a modified form of the dialogue box C of FIG. 2b is shown which includes provision for entry of "your user number" in box 21.

At the time a prospective new user enters his/her details into the other boxes comprising the dialogue box C, there is an option for the user to enter a user number into box 21. The user number is provided by the registration authority 16 as a number unique to that particular registered user. If the box 21 has the user number details inserted into it, then the registration routine, When the next copy of the protected application is made, will transfer the user number details from box 21 to the "last user number" box 22. A similar transfer will take place when next a copy is made of the protected application if and only if the person wishing to register the next copy enters their user number details in box 21. If they do not, then the last user number details in box 22 remain as before. In this manner, a tracking system is available to the registration authority in the form of a tree where any given copy is identified by its ancestry based on current and previous user number as entered into boxes 21 and 22.

Self-Serialization

In a particular embodiment, a process termed "self-serialization" can be utilized to produce the serial number 50 which is displayable to the user/licensee as illustrated in FIG. 4.

The serial number 50 is disguised by use of a random or pseudorandom number input to the algorithm which generates the serial number at the time of first boot of the software as part of the initial registration procedure. For example, the serial number, when generated by the self-serialization process, can be generated by a random number routine forming part of the registration software or it can be generated by the registration software with reference to data which is available in a widely varying fashion on the platform on which the software is located—for example, a time reference on the platform. The serial number 50 generated by the self-serialization process can be a required input to the registration algorithm from which the registration number is generated. Clearly, the serial number 50, as determined and displayed to the user, will then be required to be communicated to the registration authority for input to the registration authority's registration number generating algorithm.

It will be observed that a serial number 50 generated in this manner is likely to be displayed as a different number on each platform on which the software to be protected is to be run and comprises a randomized input to the registration algorithm which is determined and determinable only at the time of registration.

Fifth Embodiment

Figure 5:
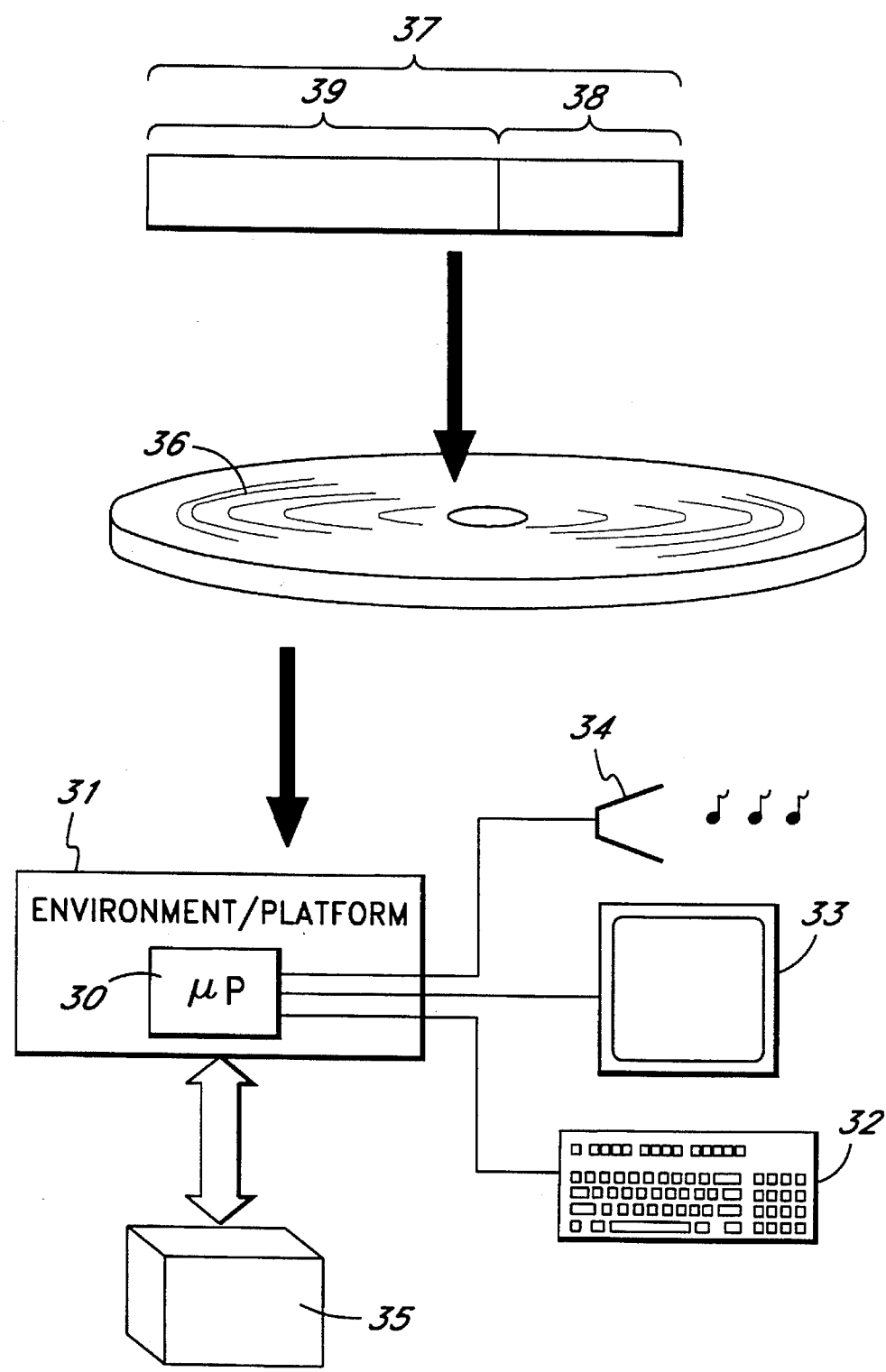
FIG. 5 is a schematic diagram of a system according to a fourth embodiment of the invention.

With reference to FIG. 5, there is shown in schematic form a microprocessor 30 adapted to operate under an operating system or upon a platform 31 such as, for example, MicroSoft DOS or Macintosh System 7. The platform 31 allows relatively high level commands to be used to cause the microprocessor 30 to interact with input/output devices such as keyboard 32, monitor 33, loudspeaker 34, memory 35 and magnetic or CD ROM disk 36.

By way of example a word processing program comprising a length of code or digital data 37 has been copied onto disk 36.

The digital data 37 includes registration code portion 38 and use code portion 39.

The digital data 37 is arranged in such a way that when microprocessor 30 seeks to first execute the digital data 37 by way of operating system or platform 31 the digital data comprising the registration code portion 38 is caused to execute first in a manner previously described in reference to the first embodiment of the invention. The execution of the digital data comprising the registration code portion 38 in conjunction with the operating system or platform 31 comprises a mode switcher which will permit the microprocessor 30 to execute the use code portion 39 of digital data 37 only in a demonstration mode unless and until registration involving reference to an external registration authority is first completed successfully. This registration procedure is as previously described with reference to the first embodiment.

The digital data 37 can comprise, for example, a word processing program such as Wordperfect 6.0 available from Wordperfect Corporation. The registration code portion 38 is integral with the digital data 37 comprising the word processing program. The registration code portion 38 includes the algorithm for calculation of the registration number as previously described in respect of other embodiments of the invention.

It will be appreciated that the registration code portion 38 effectively forms simply a part of the software or digital data 37 to be protected/registered and that the digital data 37 will be or can be identical for all copies of the word processing program produced. The registration code portion 38 allows a unique link to be made between the digital data 37 and an individual authorized or licensed to use the digital data 37 by way of initial execution of a copy of the digital data comprising registration code portion 38.

Figure 6:
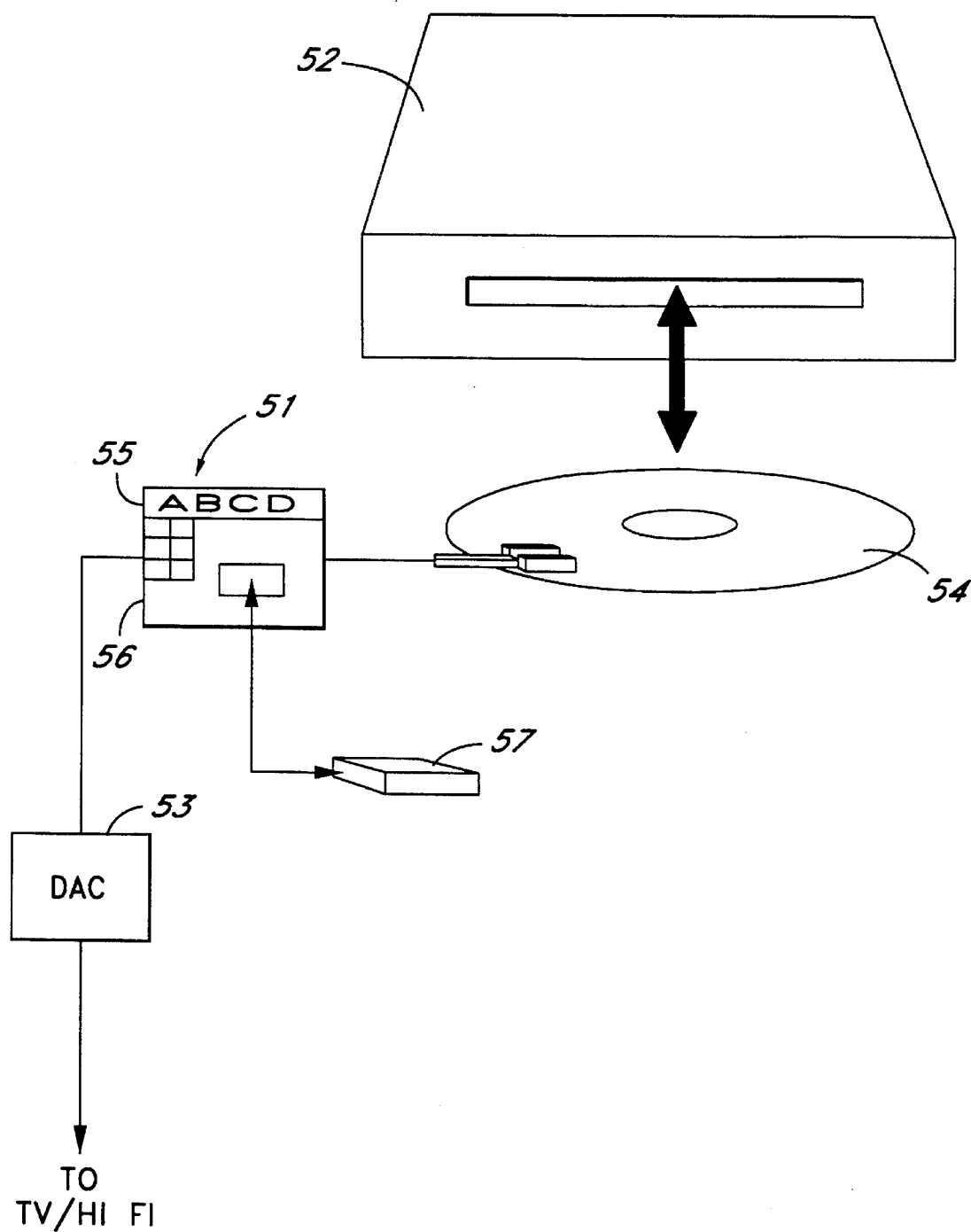
FIG. 6 is an implementation of the fourth embodiment of FIG. 5 in relation to a CD ROM drive.
Figure 7:
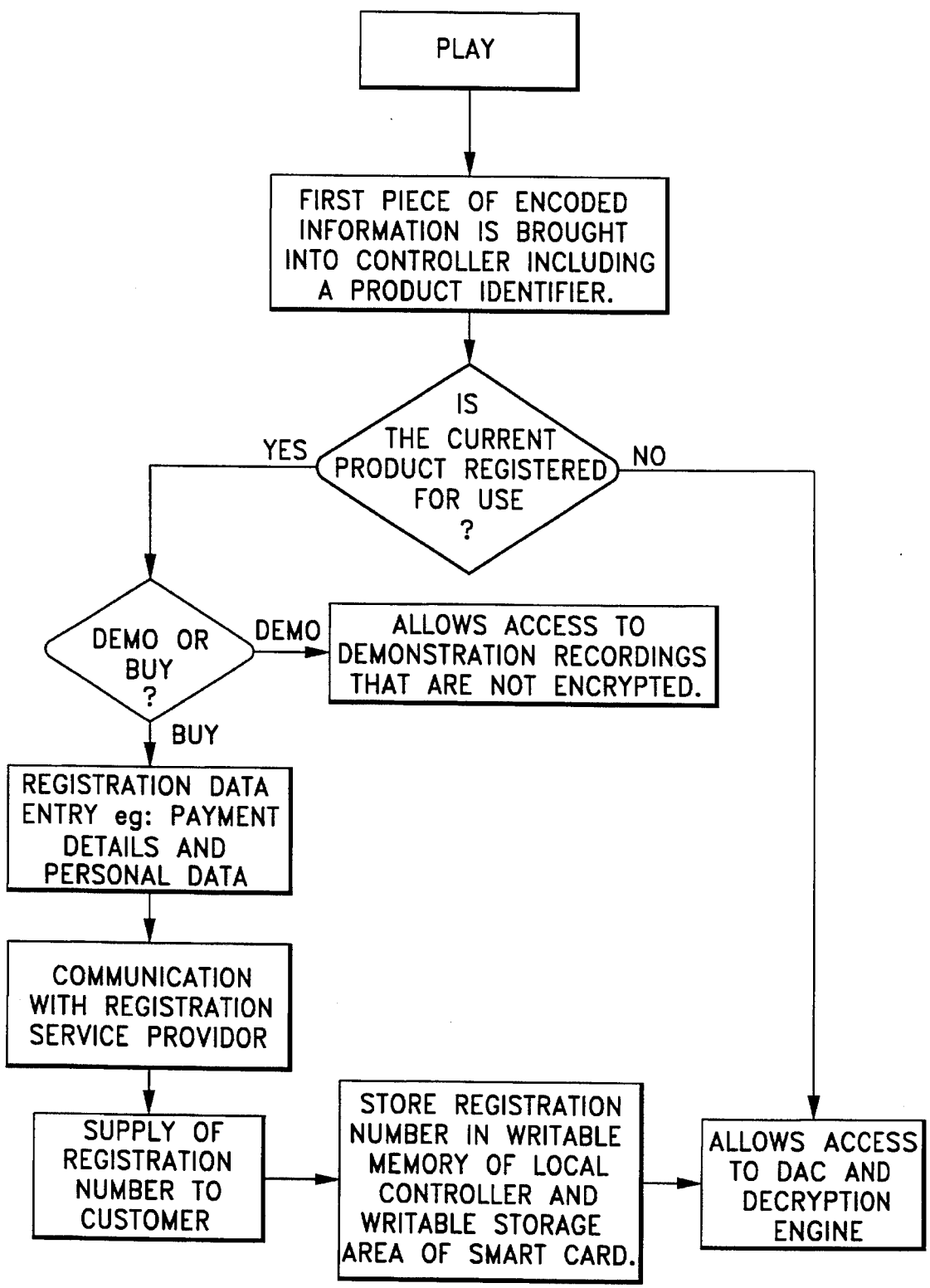
FIG. 7 is a logic flow chart in relation to the decoder box of FIG. 6.

With reference to FIGS. 6 and 7, a specific realization of the fifth embodiment will be described.

With particular reference to FIG. 6, a decoder 51 is interposed in the datapath from the CD in CD player 52 and a digital-to-analog converter 53. The digital-to-analog converter 53 is the device by which digitally encoded musical or video information residing on CD ROM 54 is converted to analog form suitable for playback on current mass produced television sets (video) or hi-fi sets (audio).

The decoder 51 comprises part of the platform upon which the digital data 37 is executed and includes means to interpret the code portion 38 of the digital data 37 whereby the registration system is implemented such that the digital data 37 and, more particularly, the use code portion 39 of that digital data 37 can be executed on the platform in a use mode only if the registration procedure to which reference has been made in respect of previous embodiments has been performed.

The registration code portion 38 can include a preview or demonstration related to a subset of the balance of the digital data on the CD 54 which can be executed by the platform without license.

The decoder 61 includes LCD display 55 and keypad 56 whereby the licensee can enter information via keypad 56 and receive information via the LCD display 55 for the purpose of the registration procedure.

In addition a smart card (SRAM) 57 is receivable by the decoder 81 for the purpose of customizing or amending operation of the decoder 51.

With reference to FIG. 7, the registration procedure following insertion of CD 54 into CD player 52 is as follows. The user operates the play control and decoder 51 reads from CD 54 code portion 38 of digital data 37 located thereon and executes this code so as to determine whether the digital data is already licensed for the platform. If not, a demonstration is communicated via digital-to-analog converter 63 whilst the user determines whether to register as a licensee of the digital data 37 in the manner indicated in the flowchart of FIG. 7.

Sixth Embodiment

With reference to FIG. 8, there is shown a block diagram of a system according to a further embodiment of the invention which is to be read in the context of the earlier generalized description in respect of FIG. 1.

The system illustrated in FIG. 8 operates in the manner generally described in respect of previous embodiments and as generally outlined in the diagram. In the context of the block C illustrated in FIG. 4, and with reference to FIG. 9, the algorithm, which generates the unique user identification and which is resident both as the registration code portion 38 in digital data 37 integrally bound to use code portion 39 for execution on local platform 31 and also as remote algorithm 61, is attached to registration database program 62 for execution on the remote platform 63.

The algorithm, in this embodiment, combines by addition the serial number 50 with the software product name 64 and customer information 65 and previous user identification 22 to provide registration number 66.

As discussed earlier, all of the items to be summed, namely items 50, 64, 65 and 22 must be communicated to the remote licensee unique ID generator 67 by the intending licensee whereby algorithm 51 causes the production of a registration number 66 which matches identically with the locally produced registration number. When mode switcher 68 verifies the match, then the mode switcher 68 allows execution on platform 31 of the full user program 39.

Prior to allowing execution of the full program, mode switcher 68 will also check whether platform ID 69 has changed as provided to it by platform unique ID generator 70.

In this embodiment, serial number 50 is comprised of two components, namely system information 71 and a variable key portion 72. The variable key portion 72 provides the characteristic of self serialization described earlier in the specification and, in this embodiment, is generated at the time of registration on platform 31 by reference to a variable platform parameter, in this case reference to system time information, although other parameters which are variable can be utilized in other embodiments.

System information 71 can include information which identifies the hardware comprising the platform 31 on which the user program 39 is to be executed such as, for example, CPU number (where available), or unique parameters associated with the firmware in use. The system information, optionally, can further include system configuration information such as amount of memory, type of processor etc.

It will be noted, therefore, that serial number 50 will appear to an intending licensee when it appears on screen as per box C in FIG. 4 as an apparently random variable having no obvious link to the platform 31 or the user program 39.

However, when the serial number 50 is communicated to the remote licensee unique ID generator 67 a secondary algorithm complementary to the algorithm which generated the serial number including variable key portion 72 and system information 71 is able to "decode" or otherwise strip away the variable key portion 72 so as to make use of the system information 71 if allowable and desirable in the circumstances.

Whether the system information 71 is utilized or not, the serial number 50 generated in this manner provides an input to the algorithm which generates registration number 66 which presents as an apparently variable parameter thereby rendering "cracking" of the software registration system more difficult and unlikely.

Seventh Embodiment

Figure 9:
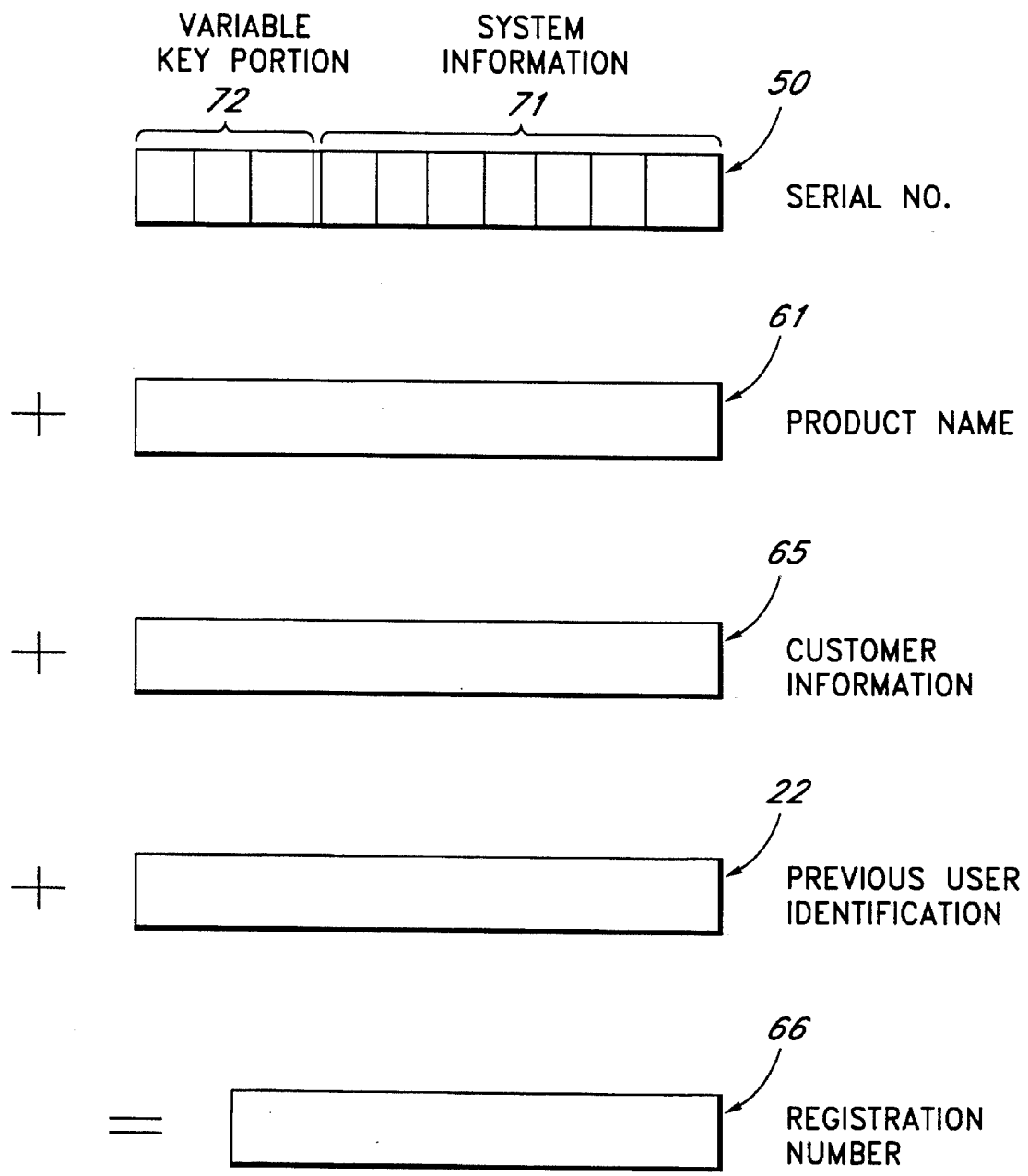
FIG. 9 is a block diagram indicating one particular example of generation of a registration number for the system of FIG. 8.
Figure 10:
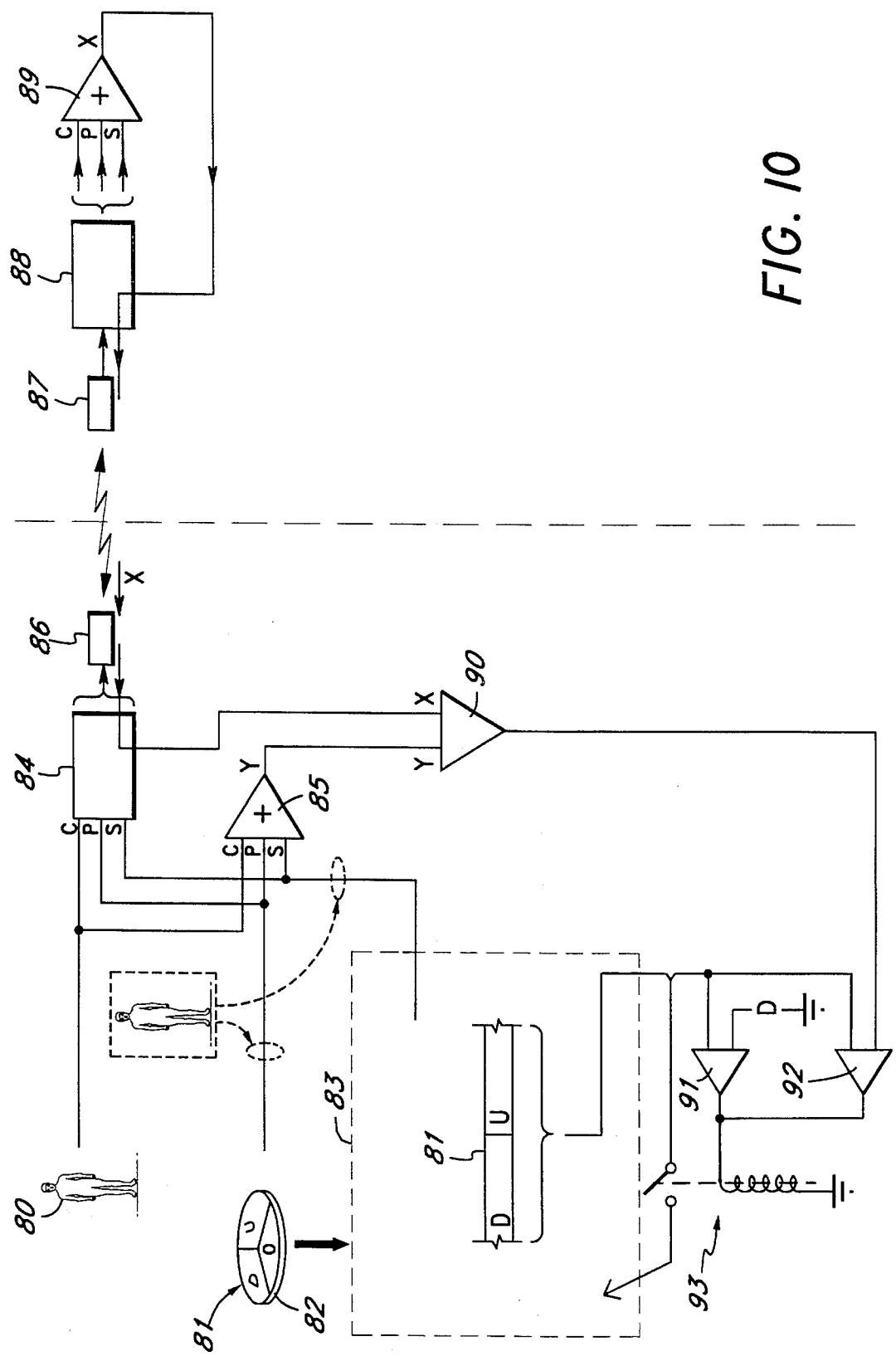
FIG. 10 is a schematic diagram of a sixth embodiment comprising a particular example of the generalized system of FIG. 8.

The schematic diagram of FIG. 10 illustrates a substantially hardware implementation of the invention applicable, for example, for implementation of the CD arrangement of FIG. 6 or the more generalized arrangement of FIGS. 8 and 9.

In this embodiment, a prospective user 80 of digital code 81 on media 82 by its execution on platform 83 firstly inserts the media 82 into an appropriate digital code reading device within platform 83 (e.g., a floppy disk drive or a CD ROM drive).

Customer information C is provided by user 80 both direct to local encoder/decoder 84 and also to local adder or summer 85.

Additionally, product information P derived from media 82 (typically via platform 83) or else via the intermediary of the user (signified by the small man symbol) is provided to encoder/decoder 84 and to summer 85.

Finally, a serial number S derived from platform 83 is supplied either directly or via the intermediary of user 80 to encoder/decoder 84 and to summer 85.

Summer 85 acts as a local licensee unique ID generating means by combining, by addition, customer information C, product information P and serial number S in order to provide a local licensee unique ID here designated Y.

Encoder/decoder 84 transmits the serial number S, the customer information C and the product information P via modems 86, 87 over the public switched telephone network to a remote encoder/decoder 88 which, in turn, supplies signals S, C and P to the inputs of remote summer 89. Remote summer 89 combines these signals by addition (thereby acting as a remote license unique ID generating means) so as to provide a summed output, here termed X, which represents a licensee unique ID or enabling key which should match identically with the local licensee unique ID or registration key or registration number Y if inputs S, C and P to summers 85 and 89 are identical.

The licensee unique ID termed X is transmitted back via encoder/decoders and modems 84, 86, 87, 88 to comparator 90 which outputs a high signal if X equals Y. This condition corresponds to the local licensee unique ID matching with the licensee unique ID generated at the remote location by the remote licensee unique ID generating means generally comprising summer 89.

Digital code 81 on media 82 comprises code identified as a demonstration portion D together with code identified as a use portion U. There may be other kinds of code designated O as well.

Code 81 is executed on platform 83 (for example, a microprocessor or a substantially hardware based, dedicated playback device such as a CD drive) with the code being passed through a mode switcher comprising first gate 91 and second gate 92 together with relay 93.

First gate 91 energizes relay 93 so as to permit execution of code of type D but not code of any other type such as of type U.

Second gate 92 permits execution of any kind of code by closure of relay 93 provided only that the output of comparator 90 is high (which is to say that X equals Y or that the local licensee unique ID matches with the licensee unique ID generated by the remote licensee unique ID generating means comprising summer 89).

Comparator 90 together with gates 91, 92 and relay 93 comprise one particular form of mode switcher or switching platform 83 of various kinds of code such as the code of types D and U.

Industrial Applicability

The aforementioned may be applied either in dedicated electronic hardware or by means of more generalized digital computation devices such as microprocessors and the like whereby digital code or software (which may incorporate at least part of the code which, when executed, acts as a licensee unique ID generator) is fully enabled only after following a specified licensing procedure.

The above describes only some embodiments of the present invention and modifications, obvious to those skilled in the art, can be made thereto without departing from the scope and spirit of the present invention.

What is claimed is:

1. A registration system for licensing execution of digital data in a use mode, said digital data executable on a platform, said system including local licensee unique ID generating means and remote licensee unique ID generating means, said system further including mode switching means operable on said platform which permits use of said digital data in said use mode on said platform only if a licensee unique ID first generated by said local licensee unique ID generating means has matched a licensee unique ID subsequently generated by said remote licensee unique ID generating means; and wherein said remote licensee unique ID generating means comprises software executed on a platform which includes the algorithm utilized by said local licensee unique ID generating means to produce said licensee unique ID.

2. The system of claim 1, wherein said local licensee unique ID generating means generates said local licensee unique ID by execution of a registration algorithm which combines information in accordance with said algorithm, said information uniquely descriptive of an intending licensee of said digital data to be executed in said use mode.

3. The system of claim 2, wherein said mode switching means permits operation of said digital data in said use mode in subsequent execution of said digital data only if said licensee unique ID generated by said local licensee unique ID generating means has not changed.

4. The system of claim 3, wherein said local licensee unique ID generating means comprises part of said digital data when executed on said platform.

5. The system of claim 4, wherein said mode switching means comprises part of said digital data when executed on said platform.

6. The system of claim 5, wherein the information utilized by said local licensee unique ID generating means to produce said licensee unique ID comprises prospective licensee details including at least one of payment details, contact details and name.

7. The system of claim 1, said system further including platform unique ID generating means, wherein said mode switching means will permit said digital data to run in said use mode in subsequent execution of said digital data on said platform only if said platform unique ID has not changed.

8. The system of claim 7, wherein said platform unique ID generating means comprises part of said digital data when executed on said platform.

9. The system of claim 8, wherein said platform unique ID generating means utilizes hard disc or other platform information to determine said platform unique ID.

10. The system of claim 1, wherein said platform comprises a computer operating system environment.

11. The system of claim 10, wherein said digital data comprises a software program adapted to run under said operating system environment.

12. A registration system attachable to software to be protected, said registration system generating a security key from information input to said software which uniquely identifies an intended registered user of said software on a computer on which said software is to be installed; and wherein said registration system is replicated at a registration authority and used for the purposes of checking by the registration authority that the information unique to the user is correctly entered at the time that the security key is generated by the registration system.

13. The registration system of claim 12, wherein said security key is generated by a registration number algorithm.

14. The registration system of claim 13, wherein said registration number algorithm combines information entered by a prospective registered user unique to that user with a serial number generated from information provided by the environment in which the software to be protected is to run.

15. The registration system of claim 12, wherein said registration system checks at the time of boot of said software as to whether it is a first boot of the software to be protected or a subsequent boot, and, if a subsequent boot is detected, then environment and user details are compared to determine whether the program reverts to a demonstration mode and a new user registration procedure is to commence or a full version run.

16. The registration system of claim 15, wherein said environment details comprise at least one element which is not user-configurable on the platform.

17. A method of control of distribution of software, said method comprising providing mode-switching means associated with said software adapted to switch said software between a fully enabled mode and a partly enabled or demonstration mode, said method further comprising providing registration key generating means adapted to generate a registration key which is a function of information unique to an intending user of the software; said mode-switching means switching said software into fully enabled mode only if an enabling key provided to said mode-switching means by said intending user at the time of registration of said software has matched identically with said registration key; and wherein said enabling key is communicated to said intending user at the time of registration of said software; said enabling key generated by a third party means of operation of a duplicate copy of said registration key generating means.

18. The method of claim 17, wherein said registration key is also a function of the environment in which said software is installed.

19. A remote registration station incorporating remote licensee unique ID generating means, said station forming part of a registration system for licensing execution of digital data in a use mode, said digital data executable on a platform, said system including local licensee unique ID generating means, said system further including mode switching means operable on said platform which permits use of said digital data in said use mode on said platform only if a licensee unique ID generated by said local licensee unique ID generating means has matched a licensee unique ID generated by said remote licensee unique ID generating means; and wherein said remote licensee unique ID generating means comprises software executed on a platform which includes the algorithm utilized by said local licensee unique ID generating means to produce said licensee unique ID.

20. A method of registration of digital data so as to enable execution of said digital data in a use mode, said method comprising an intending licensee operating a registration system for licensing execution of digital data in a use mode, said digital data executable on a platform, said system including local licensee unique ID generating means and remote licensee unique ID generating means, said system further including mode switching means operable on said platform which permits use of said digital data in said use mode on said platform only if a licensee unique ID generated by said local licensee unique ID generating means has matched a licensee unique ID generated by said remote licensee unique ID generating means; and wherein said remote licensee unique ID generating means comprises software executed on a platform which includes the algorithm utilized by said local licensee unique ID generating means to produce said licensee unique ID.

* * * * *

US005490216C1

(12) EX PARTE REEXAMINATION CERTIFICATE (8580th)

United States Patent
Richardson, III

(10) Number: US 5,490,216 C1
(45) Certificate Issued: Oct. 4, 2011

(54) SYSTEM FOR SOFTWARE REGISTRATION

(75) Inventor: Frederic B. Richardson, III, Brookvale (AU)

(73) Assignee: Uniloc (Singapore) Private Limited, Singapore (SG)

Reexamination Request:
No. 90/010,831, Jan. 22, 2010

Reexamination Certificate for:
Patent No.: 5,490,216
Issued: Feb. 6, 1996
Appl. No.: 08/124,718
Filed: Sep. 21, 1993

(51) Int. Cl.
*G06F 1/00* (2006.01)
*G06F 21/00* (2006.01)
*G06Q 30/00* (2006.01)

(52) U.S. Cl. ............................................. 705/59; 705/56
(58) Field of Classification Search .................. None
See application file for complete search history.

(56) References Cited

U.S. PATENT DOCUMENTS

| | | | |
|---|---|---|---|
| 4,118,789 A | 10/1978 | Casto et al. |
| 4,120,030 A | 10/1978 | Johnstone |
| 4,200,770 A | 4/1980 | Hellman et al. |
| 4,218,582 A | 8/1980 | Hellman et al. |
| 4,246,638 A | 1/1981 | Thomas |
| 4,278,837 A | 7/1981 | Best |
| 4,323,921 A | 4/1982 | Guillou |
| 4,337,483 A | 6/1982 | Guillou |
| 4,405,829 A | 9/1983 | Rivest et al. |
| 4,446,519 A | 5/1984 | Thomas |

(Continued)

FOREIGN PATENT DOCUMENTS

| | | |
|---|---|---|
| AU | PL 4842 | 9/1992 |
| AU | PL 5524 | 10/1992 |
| DE | 40 19 652 A1 | 1/1992 |
| JP | 4-117548 A | 4/1992 |
| JP | 4-369068 A | 12/1992 |
| JP | 5-181734 A | 7/1993 |
| WO | WO 92/09160 A1 | 5/1992 |
| WO | WO 92/22021 A1 | 11/1992 |
| WO | WO 92/22022 A1 | 11/1992 |
| WO | WO 93/01550 A1 | 1/1993 |

OTHER PUBLICATIONS

Rivest, RFC 1321, "The MD% Message–Digest Algorithm," Apr. 1992.*

(Continued)

*Primary Examiner* — Matthew Heneghan

(57) ABSTRACT

A registration system allows digital data or software to run in a use mode on a platform if and only if an appropriate licensing procedure has been followed. Preferably, the system detects when part of the platform on which the digital data has been loaded has changed in part or in entirely, as compared with the platform parameters, when the software or digital data to be protected was last booted or run. The system relies on a portion of digital data or code which is integral to the digital data to be protected by the system. This integral portion is termed the code portion and may include an algorithm that generates a registration number unique to an intending licensee of the digital data based on information supplied by the licensee which characterizes the licensee. The algorithm in the code portion is duplicated at a remote location on a platform under the control of the licensor or its agents, and communication between the intending licensee and the licensor or its agent is required so that a matching registration number can be generated at the remote location for subsequent communication to the intending licensee as a permit to licensed operation of the digital data in a use mode. The code portion can be identical for all copies of the digital data. The algorithm provides a registration number which can be "unique" if the details provided by the intending licenses upon which the algorithm relies when executed upon the platform are themselves "unique".

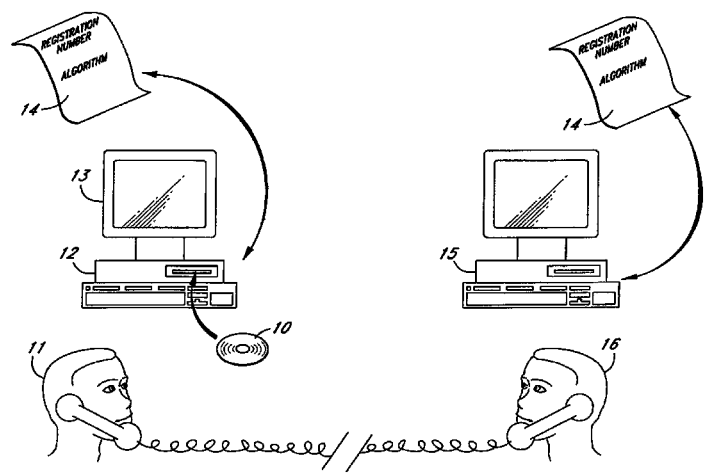

U.S. PATENT DOCUMENTS

| | | |
|---|---|---|
| 4,450,535 A | 5/1984 | de Pommery et al. |
| 4,456,901 A | 6/1984 | Kurtz et al. |
| 4,458,315 A | 7/1984 | Uchenick |
| 4,471,163 A | 9/1984 | Donald et al. |
| 4,484,217 A | 11/1984 | Block et al. |
| 4,558,176 A | 12/1985 | Arnold et al. |
| 4,584,641 A | 4/1986 | Guglielmino |
| 4,588,991 A | 5/1986 | Atalla |
| 4,589,064 A | 5/1986 | Chiba et al. |
| 4,593,353 A | 6/1986 | Pickholtz |
| 4,593,376 A | 6/1986 | Volk |
| 4,609,777 A | 9/1986 | Cargile |
| 4,633,036 A | 12/1986 | Hellman et al. |
| 4,646,234 A | 2/1987 | Tolman et al. |
| 4,652,990 A | 3/1987 | Pailen et al. |
| 4,654,799 A | 3/1987 | Ogaki et al. |
| 4,658,093 A | 4/1987 | Hellman |
| 4,672,572 A | 6/1987 | Alsberg |
| 4,677,434 A | 6/1987 | Fascenda |
| 4,683,553 A | 7/1987 | Mollier |
| 4,685,055 A | 8/1987 | Thomas |
| 4,688,169 A | 8/1987 | Joshi |
| 4,712,238 A | 12/1987 | Gilhousen et al. |
| 4,740,890 A | 4/1988 | William |
| 4,747,139 A | 5/1988 | Taaffe |
| 4,748,561 A | 5/1988 | Brown |
| 4,780,821 A | 10/1988 | Crossley |
| 4,785,361 A | 11/1988 | Brotby |
| 4,791,565 A | 12/1988 | Dunham et al. |
| 4,796,181 A | 1/1989 | Wiedemer |
| 4,796,220 A | 1/1989 | Wolfe |
| 4,817,140 A | 3/1989 | Chandra et al. |
| 4,827,508 A | 5/1989 | Shear |
| 4,864,494 A | 9/1989 | Kobus, Jr. |
| 4,866,769 A | 9/1989 | Karp |
| 4,868,877 A | 9/1989 | Fischer |
| 4,885,778 A | 12/1989 | Weiss |
| 4,888,798 A | 12/1989 | Earnest |
| 4,891,503 A | 1/1990 | Jewell |
| 4,903,296 A | 2/1990 | Chandra et al. |
| 4,924,378 A | 5/1990 | Hershey et al. |
| 4,937,863 A | 6/1990 | Robert et al. |
| 4,959,861 A | 9/1990 | Howlette |
| 4,977,594 A | 12/1990 | Shear |
| 4,982,430 A | 1/1991 | Frezza et al. |
| 4,999,806 A | 3/1991 | Chernow et al. |
| 5,005,122 A | 4/1991 | Griffin et al. |
| 5,005,200 A | 4/1991 | Fischer |
| 5,014,234 A | 5/1991 | Edwards, Jr. |
| 5,023,907 A | 6/1991 | Johnson et al. |
| 5,027,398 A | 6/1991 | Miyoshi |
| 5,033,084 A | 7/1991 | Beecher |
| 5,034,980 A | 7/1991 | Kubota |
| 5,047,928 A | 9/1991 | Wiedemer |
| 5,048,085 A | 9/1991 | Abraham et al. |
| 5,050,213 A | 9/1991 | Shear |
| 5,081,676 A | 1/1992 | Chou et al. |
| 5,083,309 A | 1/1992 | Beysson |
| 5,103,476 A | 4/1992 | Waite et al. |
| 5,109,413 A | 4/1992 | Comerford et al. |
| 5,113,518 A | 5/1992 | Durst, Jr. et al. |
| 5,123,045 A | 6/1992 | Ostrovsky et al. |
| 5,138,712 A | 8/1992 | Corbin |
| 5,144,667 A | 9/1992 | Pogue, Jr. et al. |
| 5,146,575 A | 9/1992 | Nolan, Jr. |
| 5,148,481 A | 9/1992 | Abraham et al. |
| 5,155,680 A | 10/1992 | Wiedemer |
| 5,162,638 A | 11/1992 | Diehl et al. |
| 5,191,611 A | 3/1993 | Lang |
| 5,199,066 A | 3/1993 | Logan |
| 5,204,901 A | 4/1993 | Hershey et al. |
| 5,210,795 A | 5/1993 | Lipner et al. |
| 5,222,133 A | 6/1993 | Chou et al. |
| 5,222,134 A | 6/1993 | Waite et al. |
| 5,231,668 A | 7/1993 | Kravitz |
| 5,235,642 A | 8/1993 | Wobber et al. |
| 5,239,166 A | 8/1993 | Graves |
| 5,239,648 A | 8/1993 | Nukui |
| 5,259,029 A | 11/1993 | Duncan, Jr. |
| 5,287,407 A | 2/1994 | Holmes |
| 5,287,408 A | 2/1994 | Samson |
| 5,291,598 A | 3/1994 | Grundy |
| 5,313,637 A | 5/1994 | Rose |
| 5,319,705 A | 6/1994 | Halter et al. |
| 5,337,357 A | 8/1994 | Chou et al. |
| 5,341,429 A | 8/1994 | Stringer et al. |
| 5,343,526 A | 8/1994 | Lassers |
| 5,349,643 A | 9/1994 | Cox et al. |
| 5,371,792 A | 12/1994 | Asai et al. |
| 5,375,240 A | 12/1994 | Grundy |
| 5,379,433 A | 1/1995 | Yamagishi |
| 5,386,468 A | 1/1995 | Akiyama et al. |
| 5,388,211 A | 2/1995 | Hornbuckle |
| 5,390,297 A | 2/1995 | Barber et al. |
| 5,483,658 A | 1/1996 | Grube et al. |
| 5,490,216 A | 2/1996 | Richardson, III |
| 5,495,411 A | 2/1996 | Ananda |
| 5,509,070 A | 4/1996 | Schull |
| 5,548,645 A | 8/1996 | Ananda |
| 5,579,222 A | 11/1996 | Bains et al. |
| 5,606,614 A | 2/1997 | Brady et al. |
| 5,638,513 A | 6/1997 | Ananda |
| 5,703,951 A | 12/1997 | Dolphin |
| 5,745,879 A | 4/1998 | Wyman |
| 5,940,504 A | 8/1999 | Griswold |

OTHER PUBLICATIONS

Ross Williams, "A Painless Guide to CRC Error Detection Algorithms," 33 pages, down from the World Wide Web at www.ross.net/crc/download/crc_v3.txt (document dated Aug. 19, 1993).

English Translation mailed Apr. 5, 2005 of German Publication No. DE4019652A1 published Jan. 2, 1992, translation by Corporate Translations Inc., 6 pgs.

Schull, Jonathan, "What does TAU Provide for you?", Data Sciences, Inc. et al., 1990, 2 pgs.

Schull, Jonathan, U.S. Appl. No. 07/990,455, filed Dec. 5, 1992, 42 pgs.

Schull, Jonathan, "TAU—Circadian Rhythm Software", Data Sciences, Inc. et al., 1990, 1 pg.

Osgood, David, *Mini–Mitter User's Newsletter*, vol. 8, No. 1, Spring 1990, Mini–Mitter Co. Inc, pp. 1–3.

Osgood, David, Letter to Rhythms Researcher, Mini–Mitter Co., Inc., after 1990, 2 pgs.

Osgood, David, *Mini–Mitter User's Newsletter*, vol. 10, No. 3, Winter 1991, Mini–Mitter Co. Inc, pp. 1–3.

Schull, Jonathan, "TAU: Circadian Rhythm Software (Actograms, Periodograms, Waveforms)", Data Sciences, Inc. et al., after 1990, 11 pgs.

Osgood, David, *Mini–Mitter User's Newsletter*, vol. 10, No. 1, Spring 1992, Mini–Mitter Co. Inc, pp. 1–3.

Osgood, David, *Mini–Mitter User's Newsletter*, vol. 11, No. 2, Fall 1993, Mini–Mitter Co. Inc, pp. 1–3.

Osgood, David, *Mini–Mitter User's Newsletter*, vol. 10, No. 2, Fall 1992, Mini–Mitter Co. Inc, pp. 1–3.

Schull, Jonathan, "What does TAU Provide for You?", Data Sciences, Inc. et al., 1991, 4 pgs.

"Sun's Catalyst CDware: A New Way to Shop for Software-At Your Convenience", Sun Microsystems, Inc., 0026.0-1, Jul. 1990, 2 pgs.

"Patently Obvious: A Brief Primer on the Patent System", Patently Obvious, M-CAM, Inc., Aug. 6, 2010, 4 pgs.

English abstract for Japanese Publication No. 4-117548A published Apr. 17, 1992, 1 pg.

English abstract for Japanese Publication No. 4-369068A published Dec. 21, 1992, 1 pg.

English abstract for Japanese Publication No. 5-181734A published Jul. 23, 1993, 1 pg.

* cited by examiner

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-20 is confirmed.

* * * * *

(12) EX PARTE REEXAMINATION CERTIFICATE (9580th)
United States Patent
Richardson, III

(10) Number: US 5,490,216 C2
(45) Certificate Issued: Mar. 27, 2013

(54) SYSTEM FOR SOFTWARE REGISTRATION

(75) Inventor: Frederic B. Richardson, III, Brookvale (AU)

(73) Assignee: IMF (Australia) Ltd, Perth Western Australia (AU)

Reexamination Request:
No. 90/012,179, Mar. 6, 2012

Reexamination Certificate for:
Patent No.: 5,490,216
Issued: Feb. 6, 1996
Appl. No.: 08/124,718
Filed: Sep. 21, 1993

Reexamination Certificate C1 5,490,216 issued Oct. 4, 2011

(51) Int. Cl.
*G06F 21/00* (2006.01)
*G06F 1/00* (2006.01)
*G06Q 30/00* (2006.01)

(52) U.S. Cl.
USPC .............................................. 705/59; 705/56

(58) Field of Classification Search ......................... None
See application file for complete search history.

(56) References Cited

To view the complete listing of prior art documents cited during the proceeding for Reexamination Control Number 90/012,179, please refer to the USPTO's public Patent Application Information Retrieval (PAIR) system under the Display References tab.

*Primary Examiner* — Salman Ahmed

(57) ABSTRACT

A registration system allows digital data or software to run in a use mode on a platform if and only if an appropriate licensing procedure has been followed. Preferably, the system detects when part of the platform on which the digital data has been loaded has changed in part or in entirely, as compared with the platform parameters, when the software or digital data to be protected was last booted or run. The system relies on a portion of digital data or code which is integral to the digital data to be protected by the system. This integral portion is termed the code portion and may include an algorithm that generates a registration number unique to an intending licensee of the digital data based on information supplied by the licensee which characterizes the licensee. The algorithm in the code portion is duplicated at a remote location on a platform under the control of the licensor or its agents, and communication between the intending licensee and the licensor or its agent is required so that a matching registration number can be generated at the remote location for subsequent communication to the intending licensee as a permit to licensed operation of the digital data in a use mode. The code portion can be identical for all copies of the digital data. The algorithm provides a registration number which can be "unique" if the details provided by the intending licenses upon which the algorithm relies when executed upon the platform are themselves "unique".

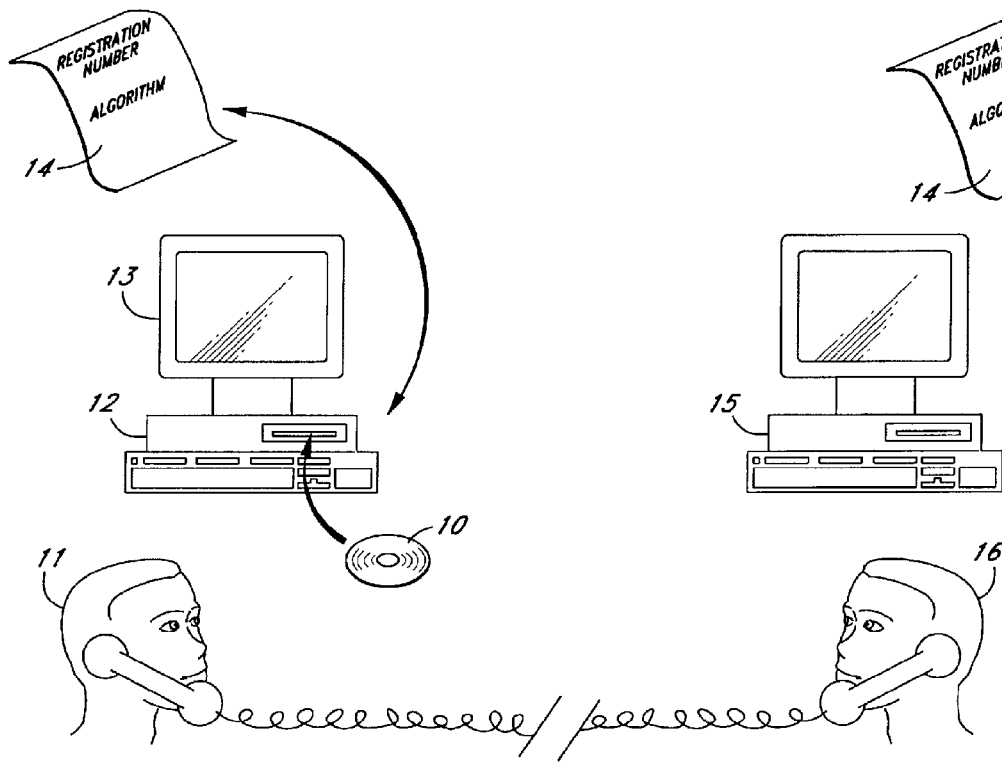

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-11 and 17-20 is confirmed.

Claims 12-16 were not reexamined.

\* \* \* \* \*